(12) United States Patent
Ishino et al.

(10) Patent No.: US 9,045,286 B2
(45) Date of Patent: Jun. 2, 2015

(54) FOOD AND DRINK CONVEYING DEVICE

(75) Inventors: Haruki Ishino, Kanazawa (JP);
Shintaro Sasahara, Kanazawa (JP);
Toshihiro Yoshida, Kanazawa (JP)

(73) Assignee: Ishino Seisakusyo Co., Ltd.,
Kanazawa-shi, Ishikawa (JP)

( * ) Notice: Subject to any disclaimer, the term of this patent is extended or adjusted under 35 U.S.C. 154(b) by 0 days.

(21) Appl. No.: 13/387,770

(22) PCT Filed: Jul. 22, 2010

(86) PCT No.: PCT/JP2010/062367
§ 371 (c)(1),
(2), (4) Date: Apr. 5, 2012

(87) PCT Pub. No.: WO2011/013573
PCT Pub. Date: Feb. 3, 2011

(65) Prior Publication Data
US 2012/0186950 A1    Jul. 26, 2012

(30) Foreign Application Priority Data

Jul. 31, 2009   (JP) ................................ 2009-179438

(51) Int. Cl.
| | |
|---|---|
| *B65G 37/00* | (2006.01) |
| *B65G 35/06* | (2006.01) |
| *A47F 10/06* | (2006.01) |
| *A47G 19/30* | (2006.01) |
| *A47G 23/02* | (2006.01) |
| *A47J 47/16* | (2006.01) |
| *B65G 17/12* | (2006.01) |
| *B65G 23/14* | (2006.01) |
| *B65G 23/18* | (2006.01) |
| *B65G 54/02* | (2006.01) |

(52) U.S. Cl.
CPC ................ *B65G 35/06* (2013.01); *A47F 10/06* (2013.01); *A47G 19/30* (2013.01); *A47G 23/0208* (2013.01); *A47J 47/16* (2013.01); *B65G 17/12* (2013.01); *B65G 23/14* (2013.01); *B65G 23/18* (2013.01); *B65G 54/025* (2013.01)

(58) Field of Classification Search
USPC ........... 198/690.1, 805, 831, 850, 853, 860.3; 414/797.1, 3
See application file for complete search history.

(56) References Cited

U.S. PATENT DOCUMENTS 3,807,313 A * 4/1974 Koyanagi ...................... 104/291
7,404,362 B2 * 7/2008 Webster et al. ................ 105/1.5

FOREIGN PATENT DOCUMENTS

| JP | 11-208859 A |   | 8/1989 |
| JP | 11208859 A | * | 8/1999 |
| JP | 2004-16464 A |   | 4/2004 |

OTHER PUBLICATIONS

STIC NPL Multi-Search word search results.*

*Primary Examiner* — Gene Crawford
*Assistant Examiner* — Lester Rushin
(74) *Attorney, Agent, or Firm* — Taft Stettinius & Hollister LLP

(57) ABSTRACT

A food and drink conveying device allows a travel body carrying food and drink to stably travel along a curved path of a travel path while maintaining stability. A travel body (7) includes a travel body main unit (26), and a leading body (27) at the front end of the travel body main unit (26) in the travel direction. The leading body (27) is supported by the travel body main unit (26) so as to be pivotable in a horizontal plane. Contact sections (29) are provided to both sides of the leading body (27) in the widthwise direction relative to the travel direction and aligned on either side in the travel direction. The contact sections (29) provided on the inner side of a curved path portion (10*a*) are configured to make contact in the curved path (10*a*) at two locations in a travel path (1*a*).

2 Claims, 11 Drawing Sheets

FOOD AND DRINK CONVEYING DEVICE

TECHNICAL FIELD

The present invention relates to a food and drink conveying device for driving a conveyor driving body so that a travel body travels along a travel path.

BACKGROUND ART

Conventional food and drink conveying devices have: an ordered item conveying path (travel path) which is provided between a kitchen area and a server area and along which food and drink are conveyed over the conveyor surface in order to provide the food and drink to a customer area; a looped chain (conveyor driving body) provided so as to be movable along the ordered item conveying path beneath the conveyor surface; and a tray (travel body) on which food and drink are mounted and which can travel over the conveyor surface by means of rollers, wherein this tray is connected to and supported by one end of a tray bracket extending from the chain, and thus the tray can travel over the conveyor surface when the chain is driven. These food and drink conveying devices have a first corner (curved path) and a second corner (curved path) along which the tray travels on the conveying path, and the first corner and the second corner are provided with a support piece on top of which the tray travels so as to prevent the rollers from receiving resistance from the conveyor surface, and thus the tray travels smoothly along the first corner and the second corner when the tray travels over the support pieces (see Patent Document 1).

PRIOR ART DOCUMENT

Patent Document

Patent Document 1: Japanese Unexamined Patent Publication 2008-44688 (page 7, FIG. 7)

SUMMARY OF THE INVENTION

Problem to Be Solved by the Invention

In the food and drink conveying device in Patent Document 1, the tray (travel body) rides over a support piece in the corner portion (curved path) in the conveying path (travel path), and as a result, the tray inclines by a predetermined angle θ relative to the conveyor surface with the tray bracket as a fulcrum, and therefore there is a risk that the stability of the food and drink placed on the tray may be lost.

The present invention is provided in order to solve this problem, and an object of the invention is to provide a food and drink conveying device which allows the travel body on which food and drink are placed to travel stably along a curved path of the travel path while maintaining the stability of the food and drink.

Means for Solving Problem

In order to achieve the above-described object, the food and drink conveying device according to the present invention has: a travel path having a curved path in at least one portion; a conveyor driving body provided along the travel path; a travel body on which food and drink are placed and which can travel along the above-described travel path; and a linking means for linking the above-described conveyor driving body to the above-described travel body, wherein the above-described travel body travels along the above-described travel path when the above-described conveyor driving body is driven, and the food and drink conveying device is characterized in that the above-described travel body comprises a travel body main unit that is driven and conveyed and a leading body provided at the front end of the travel body main unit in the direction in which the travel body (7) travels, the leading body is supported by the above-described travel body main unit so as to be pivotable in a horizontal plane, contact sections are provided to the leading body on the two sides in the widthwise direction relative to the direction in which the above-described travel body travels and are aligned on either side in the direction in which the above-described travel body travels, and the contact sections provided on the inner side of the above-described curved path make contact with the above-described travel path in two locations in the above-described curved path.

This feature makes it possible for the travel body to stably travel along a curved path while maintaining the stability of the food and drink placed on top of it because the front side of the contact sections provided on the side of the leading body on the inside of a curved path makes contact with the travel path, and after that the rear side of the contact sections make contact with the travel path so that the rotation of the leading body matches the curved path when the travel body travels along the curved path.

The food and drink conveying device according to the present invention is characterized in that the above-described contact sections are rotatable bodies supported by the above-described leading body so as to be pivotable in a horizontal plane.

This feature makes it possible for the rotatable bodies to rotate in a horizontal plane while making contact with the travel path so that noise can be prevented from being made due to friction between the travel body and the travel path.

The food and drink conveying device according to the present invention is characterized in that the above-described travel body further comprises a following body provided at the rear end of the above-described travel body main unit, contact sections are provided to the following body on the two sides in the widthwise direction relative to the direction in which the above-described travel body travels and are aligned on either side in the direction in which the above-described travel body travels, and the contact sections provided on the inner side of the above-described curved path make contact with the above-described travel path in two locations in the above-described curved path.

This feature makes it possible for the travel body to travel along a curved path in a more stable state because the leading body and the following body that are provided to the front and rear of the travel body allow two contact sections provided on the inside of the curved path to make contact with the travel path in the curved path.

BEST MODE FOR CARRYING OUT THE INVENTION

The food and drink conveying devices according to the preferred embodiments of the present invention are described below.

Embodiments

Figure 1:
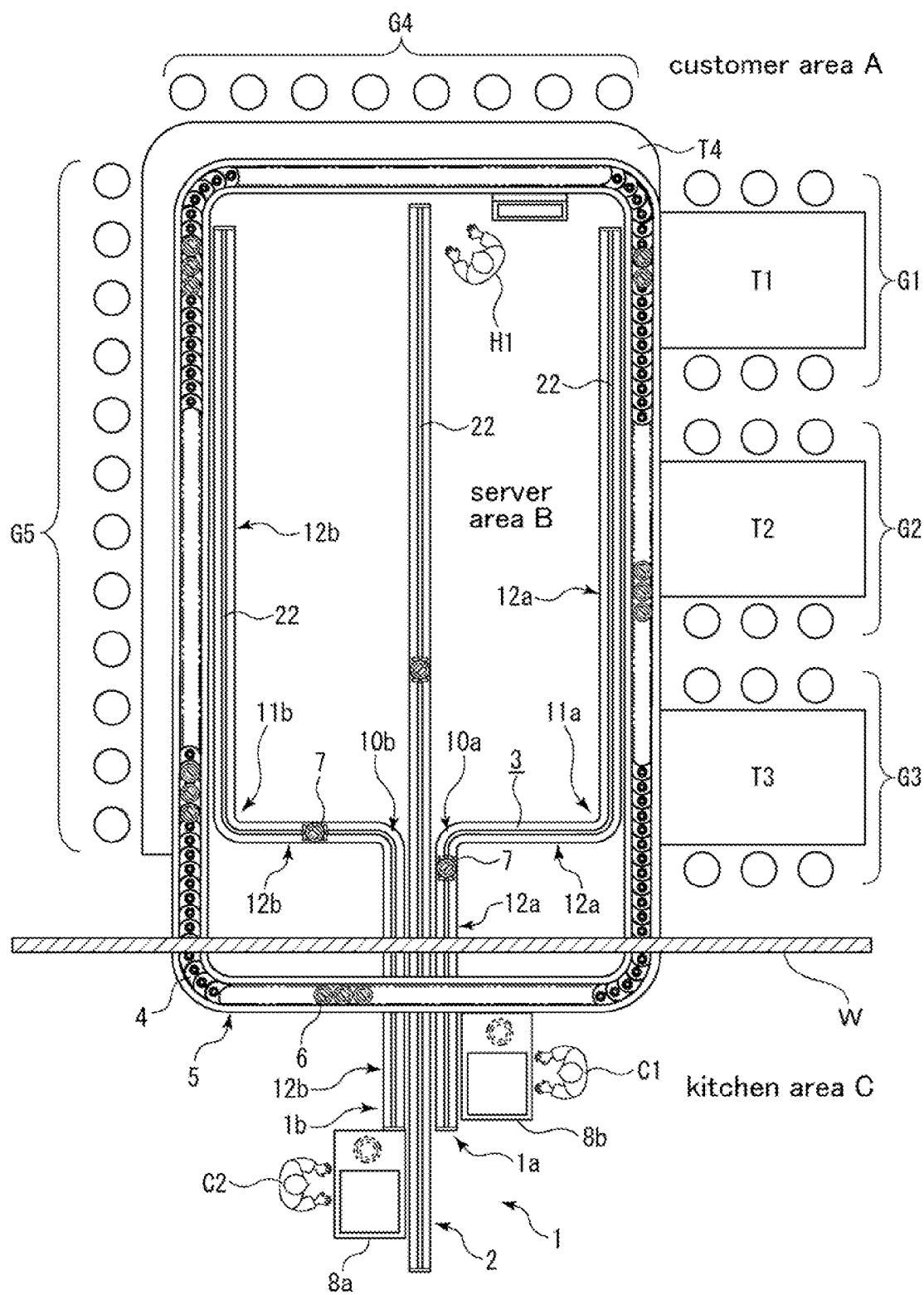
FIG. 1 is a plan diagram showing the entirety of the food and drink conveying device according to an embodiment.
Figure 3:
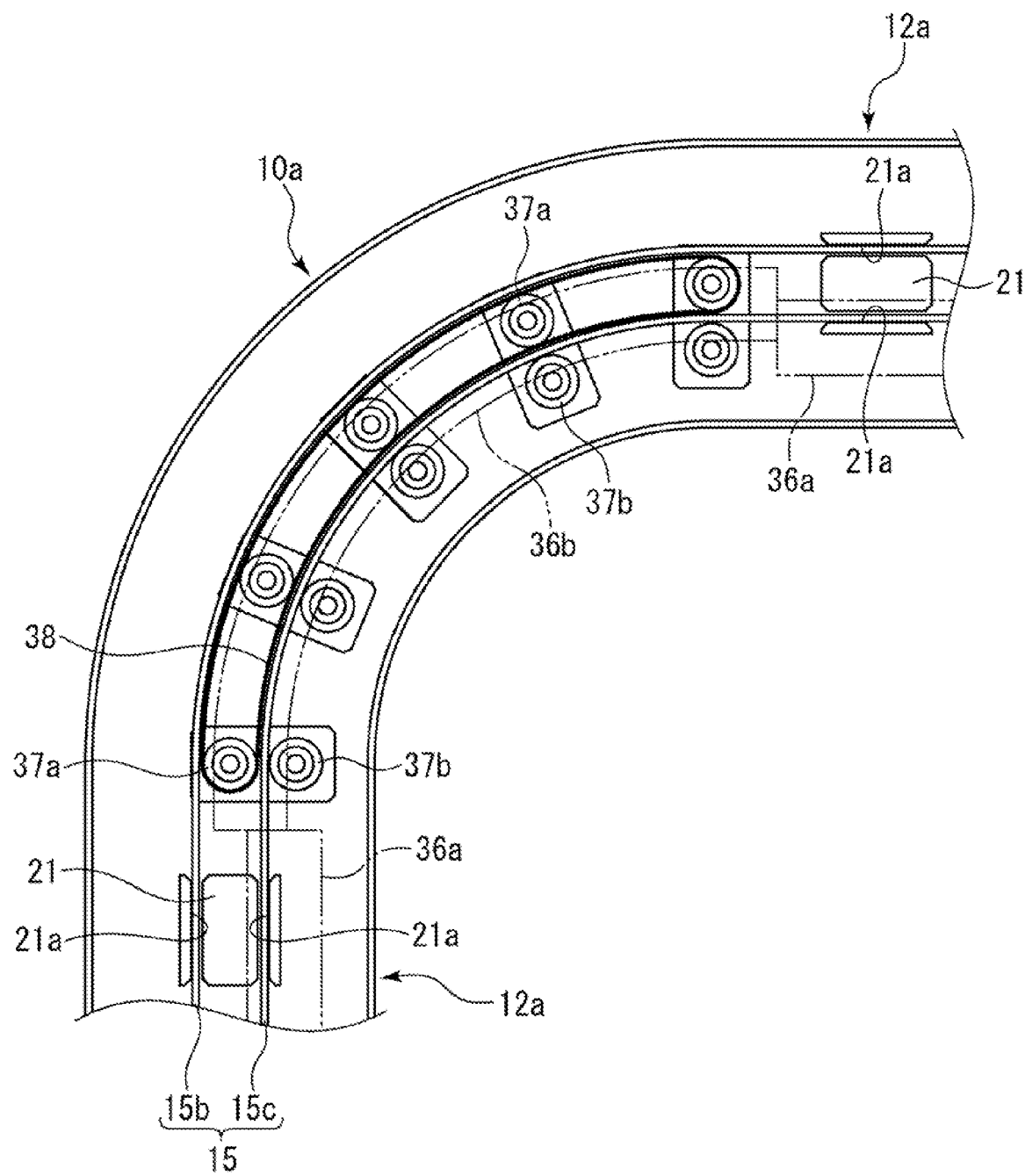
FIG. 3 is a plan diagram showing the first corner without a cover.
Figure 4:
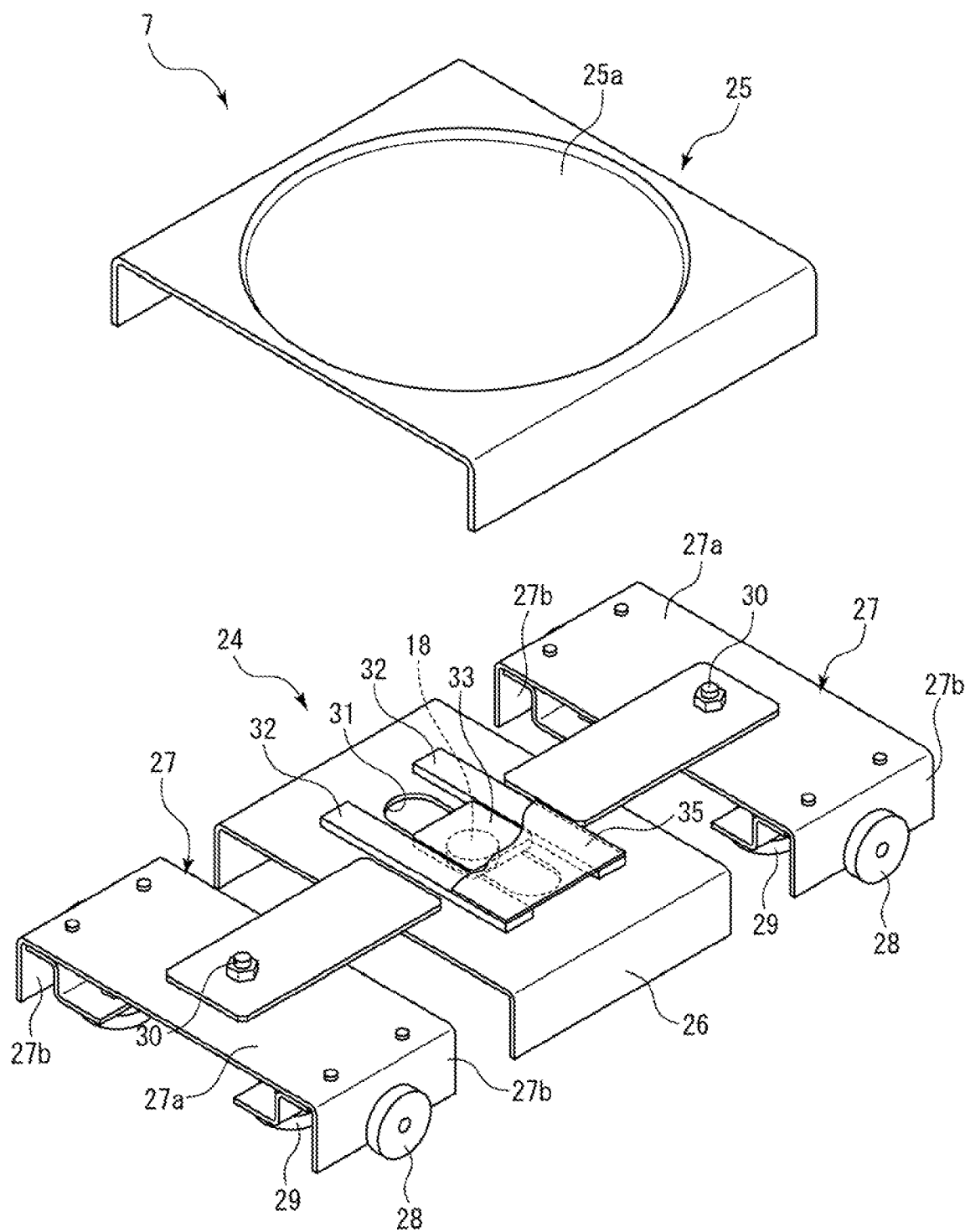
FIG. 4 is an exploded diagram showing a travel body.
Figure 5:
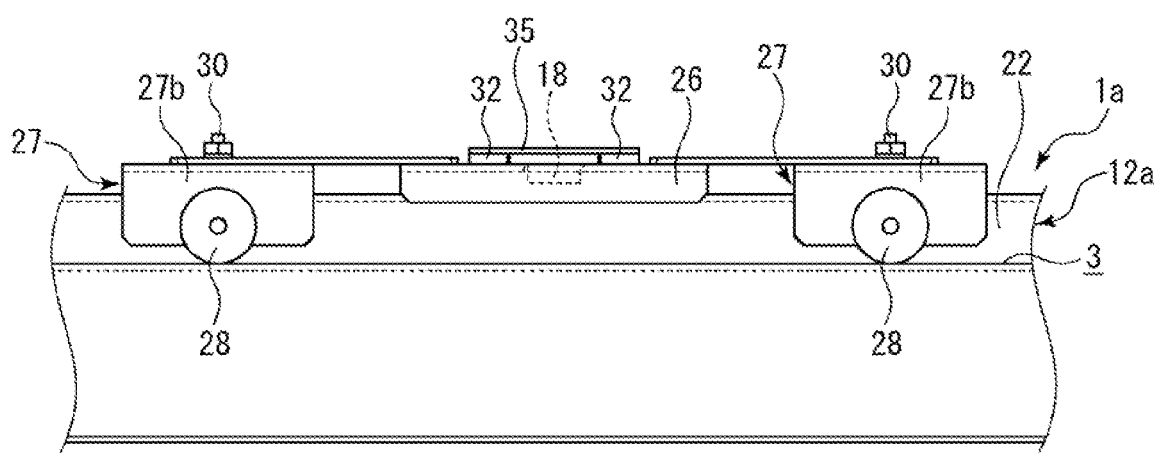
FIG. 5 is a side diagram showing a travel body in a straight path of an ordered item conveying path.
Figure 6:
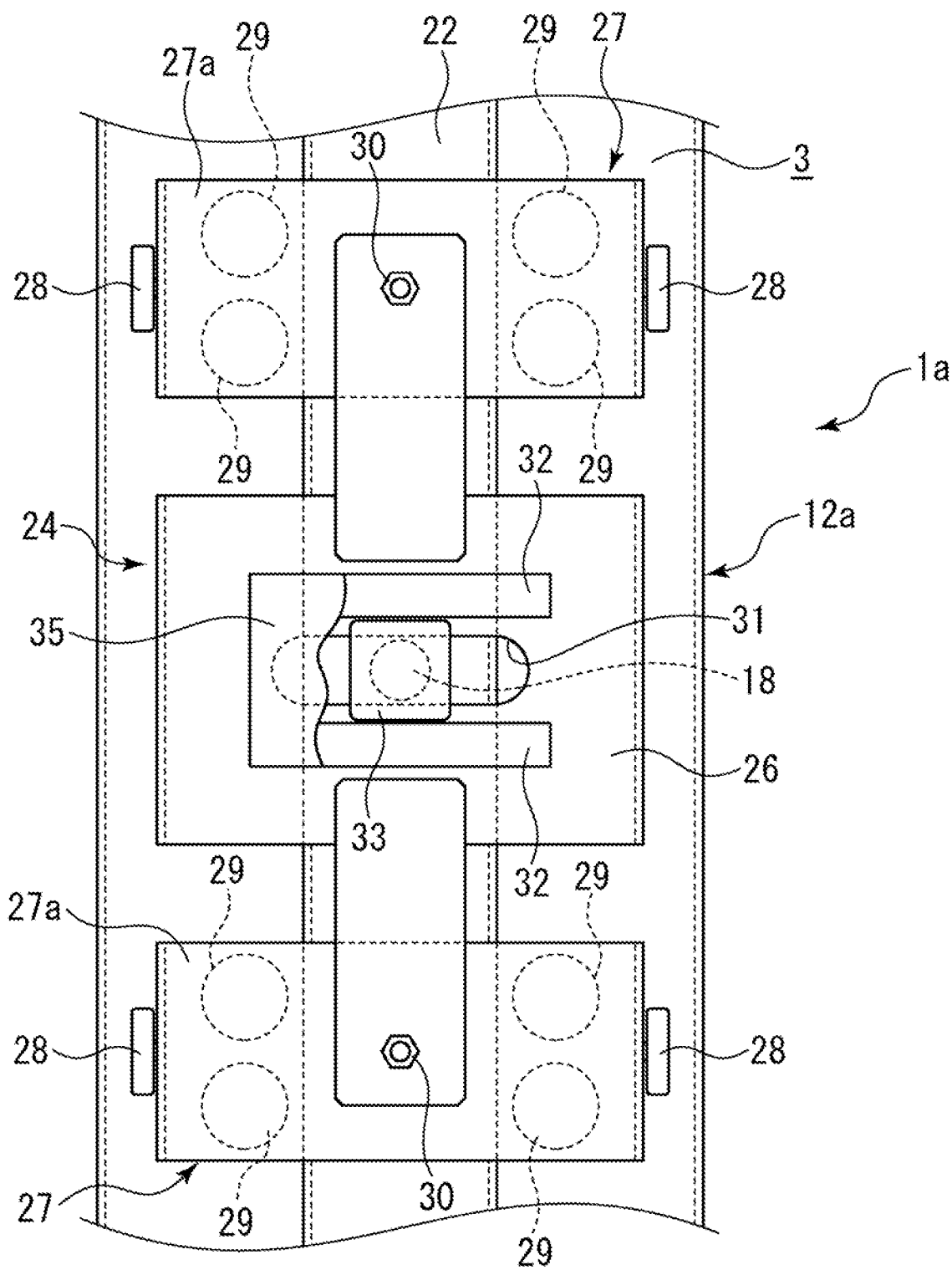
FIG. 6 is a plan diagram showing a travel body in a straight path of an ordered item conveying path.
Figure 7:
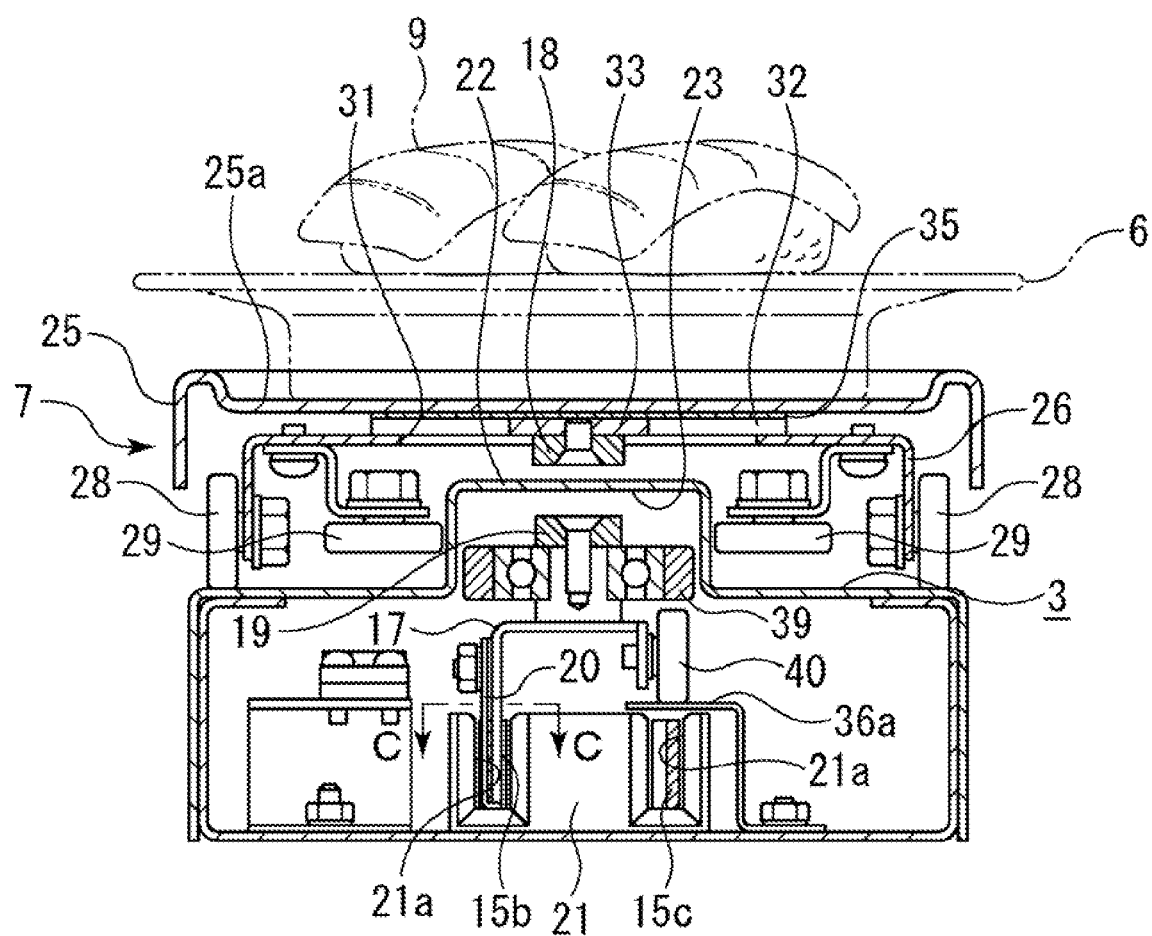
FIG. 7 is a cross-sectional diagram along A-A in FIG. 2.
Figure 8:
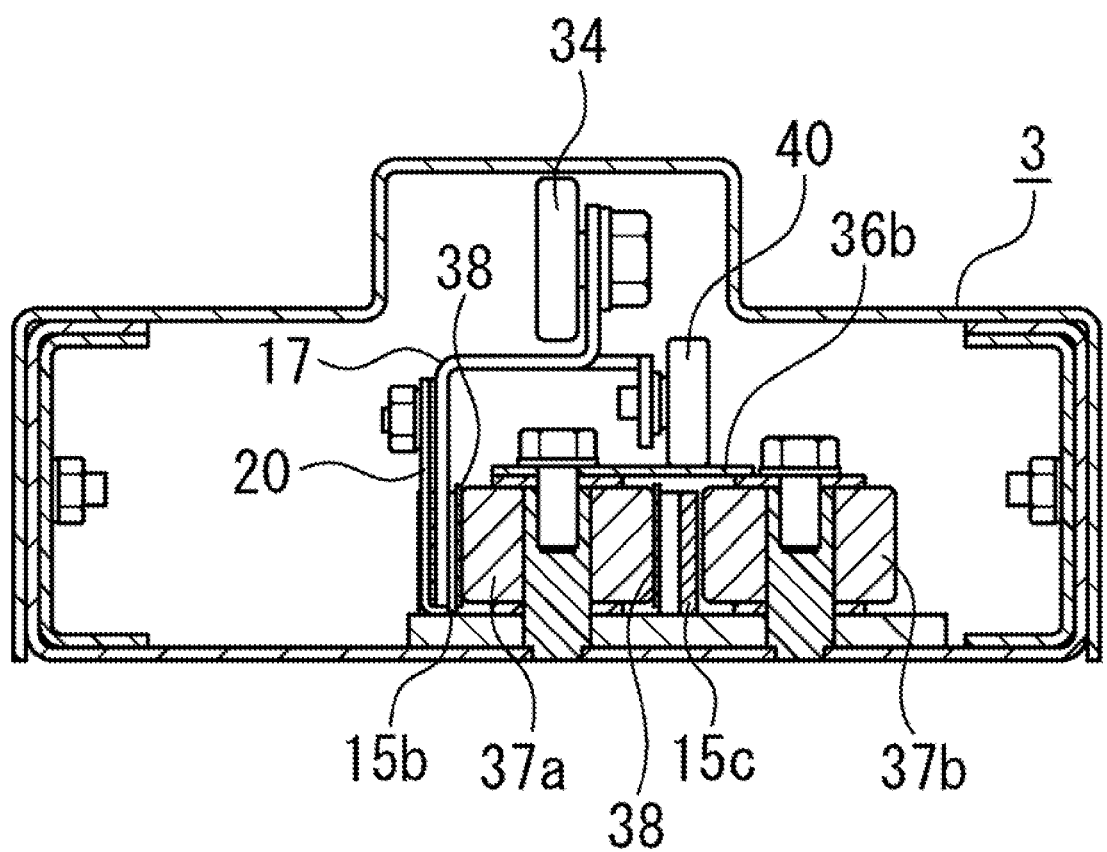
FIG. 8 is a cross-sectional diagram along B-B in FIG. 2.

The food and drink conveying device according to an embodiment is described in reference to FIGS. 1 to 11. In the following descriptions, the left side of FIG. 5 is the front side of the travel body, the upper side of FIG. 6 is the front side of the travel body, and the direction perpendicular to the drawings when being looked at in FIGS. 7 and 8 is the front side of the travel body. In FIG. 1, 1 is the food and drink conveying device to which the present invention is applied. This food and drink conveying device 1 is provided with ordered item conveying paths 1a, 1b and 2, which are travel paths according to the present invention, that run in a kitchen area C where kitchen staff C1, C2 prepare sushi, which is an example of the food and drink, and in a customer area A where customers eat and drink in conveyor belt sushi restaurants.

A circulating conveying path 5 in rectangular loop form is provided along tables T1, T2, T3 and T4 in the customer area A so as to surround the ordered item conveying paths 1a, 1b and 2. The circulating conveying path 5 is provided with a crescent chain conveyor 4 that continuously rotates, and food and drink plates 6 on which food and drink are placed are continuously conveyed on this crescent chain conveyor 4 when the crescent chain conveyor 4 is driven.

In the conveyor belt sushi restaurants where this circulating conveying path 5 is provided, the customers can take the food and drink that are being conveyed on the circulating conveying path 5 to eat and drink and can place an individual order for food and drink that are not being conveyed on the circulating conveying path 5 with a server or through an ordering device, not shown.

In addition, individually ordered food and drink are placed on any of the ordered item conveying paths 1a, 1b and 2 within the kitchen area C after being prepared in the kitchen area C so as to be conveyed to the vicinity of the customer who placed the order.

Typically, when a customer in the customer area A places an order, the kitchen staff C1, C2 in the kitchen area C behind a partition W prepare the ordered food or drink 9 at a kitchen table 8a or 8b and place it on a food and drink plate 6 (see FIG. 7). After that, as described below, the food and drink plate 6 on which the ordered food or drink 9 is placed is placed on the travel body 7 that is provided so as to travel forwards and backwards freely over the conveyor surface 3 of the ordered item conveying paths 1a, 1b and 2.

Next, the ordered food or drink 9 placed on the travel body 7 is conveyed to the server area B through the ordered item conveying path 1a, 1b or 2. At this time, the ordered food or drink 9 that has been conveyed through the ordered item conveying path 1a or 1b can be directly picked up by the customer in the area G1, G2, G3 or G5, while the ordered food or drink 9 that has been conveyed through the ordered item conveying path 2 is conveyed to the server H1 so that the server H1 hands it to the customer in the area G4.

The travel body 9 that has conveyed the ordered food or drink 9 returns to the kitchen area C after passing over the same conveyor surface 3 through the ordered item conveying path 1a, 1b or 2. That is to say, the travel body 7 is provided so as to travel forwards and backwards freely between the server area B and the kitchen area C over the conveyor surface 3 along the ordered item conveying paths 1a, 1b and 2, which are formed as independent conveying paths.

Next, the three ordered item conveying paths 1a, 1b and 2 are described. As shown in FIG. 1, the ordered item conveying paths 1a, 1b and 2 are all provided so as to run straight from the kitchen area C towards the customer area A and pass through an opening, not shown, in the partition W. Within the kitchen area C, the ordered item conveying path 2 is provided at the center and the ordered item conveying paths 1a and 1b are provided on the left and right sides of the ordered item conveying path 2 in close proximity.

That is to say, the three ordered item conveying paths 1a, 1b and 2 are provided in close proximity so that an ordered food or drink can be efficiently placed on any of these ordered item conveying paths from the same place after being prepared.

Meanwhile, within the server area B in rectangular form as viewed from the top, the ordered item conveying path 2 is provided at the center so as to divide this server area B into two. The ordered item conveying paths 1a and 1b are bent in the vicinity of the partition W to the left and right so as to be away from the ordered item conveying path 2 at the center and then run straight towards the inside of the circulating conveying path 5. Furthermore, the ordered item conveying path 1a and 1b are bent in the point close to the inside of the circulating conveying path 5 and then run along the circulating conveying path 5 towards the area G4.

That is to say, a first corner 10a (curved right) and a second corner 11a (curved left), which are the curved paths according to the present invention, are formed in the ordered item conveying path 1a in the vicinity of the partition W, and a first corner 10b (curved left) and a second corner 11b (curved right), which are the curved paths according to the present invention, are formed in the ordered item conveying path 1b in the vicinity of the partition W, respectively.

In addition, in the sections of the ordered item conveying paths 1a and 1b between the kitchen area C and the first corners 10a and 10b, between the first corners 10a and 10b and the second corners 11a and 11b, and between the second corners 11a and 11b and the area G4, the ordered item conveying paths 1a and 1b are in a straight form as straight paths 12a and 12b as described above.

Next, the ordered item conveying paths 1a, 1b and 2 as well as the travel body 7 are described in detail. Though the ordered item conveying paths 1a, 1b and 2 are different in the shape, the structure for allowing the travel body 7 to travel is the same, and therefore only the ordered item conveying path 1a is described in the following, and the descriptions of the other ordered item conveying paths 1b and 2 are omitted. Furthermore, the state where the travel body 7 is in the corner 10a or 11a in the ordered item conveying path 1a and the state where the travel body 7 is in the corner 10b or 11b in the ordered item conveying path 1b are different only in the direction in which the below-described first magnetic body 18 moves, which is opposite to each other, and therefore only the state where the travel body 7 is in the first corner 10a in the ordered item conveying path 1a is described.

Figure 2:
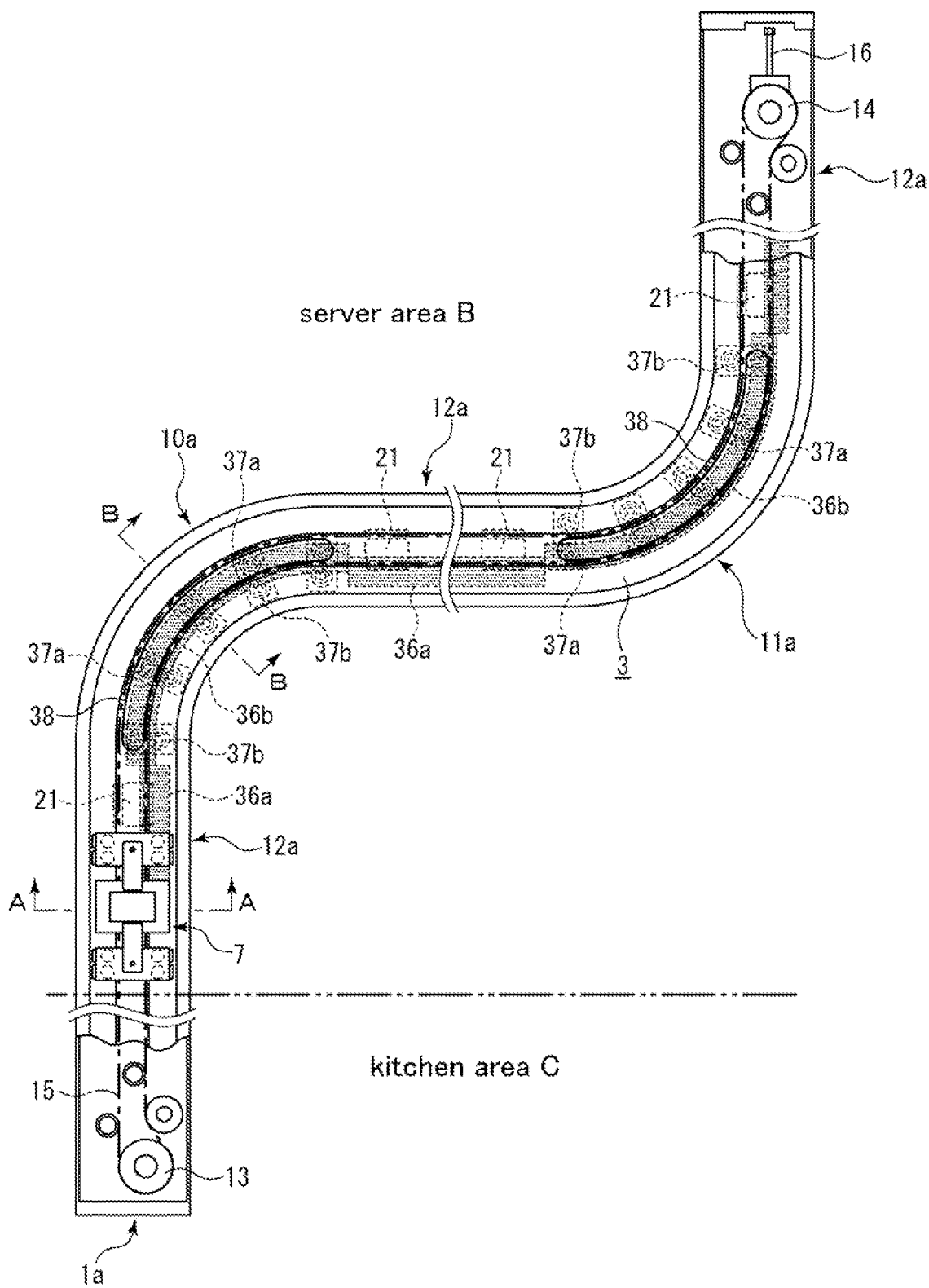
FIG. 2 is a plan diagram showing an ordered item conveying path with uncovered portions.

First, the structure of the ordered item conveying path 1a along which the travel body 7 travels is described. As shown in FIG. 2, a driving sprocket 13, which rotates in a plane by means of a driving motor, not shown, is provided at the end of the ordered item conveying path 1a on the kitchen area C side beneath the conveyor surface 3, and at the same time, a tension sprocket 14 is provided at the end of the ordered item conveying path 1a on the server area B side.

An annular driving belt 15, which is a conveyor driving body according to the present invention, goes around the driving sprocket 13 and the tension sprocket 14, which are provided at the two ends as described above. A number of protrusions 15a that can engage with the driving sprocket 13 and the tension sprocket 14 throughout the entirety of the driving belt 15 on the right side are formed on the inner surface of this driving belt 15.

These protrusions 15a engage with the driving sprocket 13 and the tension sprocket 14 so that the driving belt 15 is driven when the driving sprocket 13 rotates. As shown in FIGS. 2, 7 and 8, the driving sprocket 13 rotates clockwise in FIG. 2 so that the left side of this driving belt 15 is a forward-moving belt 15b that is driven from the kitchen area C to the server area B and the right side is a backward-moving belt 15c that is driven from the server area B to the kitchen area C when the driving belt 15 allows the travel body 7 on which food or drink is placed to travel from the kitchen area C to the server area B. Here, this tension sprocket 14 is provided with a tension adjusting portion 16 for providing tension to the driving belt 15.

Furthermore, the right side of this driving belt 15 is a forward-moving belt 15b that is driven from the kitchen area C to the server area B and the left side is a backward-moving belt 15c that is driven from the server area B to the kitchen area C when the driving belt 15 allows the travel body 7 to travel from the server area B to the kitchen area C after the food or drink has been taken in the server area B, and a case where the travel body 7 travels with food or drink placed on top from the kitchen area C to the server area B is described in the following.

The driving belt 15 is provided so that it can move along the conveyor surface 3 of the ordered item conveying path 1a beneath the conveyor surface 3 along which the travel body 7 travels. As shown in FIG. 7, the below-described belt brackets 17 are attached to predetermined portions of the forward-moving belt 15b. In addition, the driving belt 15 is guided by the below-described belt guides 21 and sliding rollers 37a and 37b along the entirety that includes the straight path 12a, the first corner 10a and the second corner 11a between the driving sprocket 13 and the tension sprocket 14.

Typically, as shown in FIGS. 2 and 7, belt guides 21 are provided at the end of the straight path 12a on the side towards which the driving belt 15 is driven. These belt guides 21 have two guide trenches 21a that have openings in the above and face the front and the rear on the left and right, and thus are formed in E shape that faces upward as viewed from the rear. The forward-moving belt 15b and the backward-moving belt 15c are contained within these guide trenches 21a so that these guide trenches 21a prevent the forward-moving belt 15b and the backward-moving belt 15c from swaying in the left and right directions.

In addition, a plate stands along the entirety of the straight path 12a on the right side of the backward-moving belt 15c. The upper end portion of this plate is bent horizontally above the backward-moving belt 15c, and thus a guide plate 36a is formed.

As shown in FIGS. 2 and 8, a number of sliding rollers 37a and 37b, which are sliding means according to the present invention, are provided in the first corner 10a so that the driving belt 15 can be slid in the direction in which the driving belt 15 is driven.

Typically, as shown in FIGS. 3 and 8, a number (five in the present embodiment) of sliding rollers 37a that make contact with the inner surface of the forward-moving belt 15b are provided on the outer side of the first corner 10a along the curve with the same curvature as the first corner 10a. Meanwhile, a number (five in the present embodiment) of sliding rollers 37b that make contact with the outer surface of the backward-moving belt 15c are provided on the inside of the first corner 10a along the curve with the same curvature as the first corner 10a. These sliding rollers 37a and 37b make pairs on the left and right so that each pair is supported in order to be pivotable in a plane. A guide plate 36b having the same curvature as the first corner 10a is attached to a portion above the sliding rollers 37a. This guide plate 36b is attached so that the upper surface continues to the upper surface of the guide plates 36a in the straight path 12a that are provided before and after the first corner 10a.

In addition, as shown in FIGS. 2 and 3, a looped sub-belt 38 made of a rubber material goes around the sliding rollers 37a provided in the first corner 10a so as to intervene between the forward-moving belt 15b and the sliding rollers 37a, and thus the forward-moving belt 15b and the sliding rollers 37a can be prevented from making contact with each other, which would generate abnormal sounds, and at the same time, the protrusions 15a can be prevented from being worn down.

Though in the present embodiment the sub-belt 38 goes around the sliding rollers 37a provided on the outer side the first corner 10a as described above, the sub-belt 38 may go around the sliding rollers 37b in addition to the sliding rollers 37a or the sub-belt 38 may go around only the sliding rollers 37b.

Furthermore, the second corner 11a has the same structure as the first corner 10a, except that the forward-moving belt 15b makes contact with the sliding rollers 37b that are provided on the inner side and the backward-moving belt 15c makes contact with the sliding rollers 37a that are provided on the outer side, and therefore the descriptions thereof are omitted.

As shown in FIG. 7, a protruding rail 22 is provided at the center of the conveyor surface 3 along the entirety of the ordered item conveying path 1a. Typically, the conveyor surface 3 is formed of a metal plate, such as of aluminum or stainless steel. The rail 22 is formed of this metal plate by applying pressure, and therefore a conveyor trench 23 in C shape that faces downward, as viewed in a cross-section, is created on the lower side of the plate from which the rail 22 is formed.

Next, the travel body 7 is described in reference to FIGS. 4 to 7. As shown in FIG. 4, the travel body 7 is formed of a carriage 24 that travels over the conveyor surface 3 and a tray 25 that is attached to this carriage 24 from the top and on which a food and drink plate 6 on which an ordered food or drink 9 is placed is to be placed. A recess 25a in which a food and drink plate 6 is placed is created on top of this tray 25, and this recess 25a can hold the food and drink plate 6 so that the food and drink plate 6 can be prevented from falling off the tray 25 when the food and drink plate 6 is placed in this recess 25a.

The carrier 24 is mainly formed of a base 26, which is the travel body main unit according to the present invention, and roller brackets 27 that are attached to the two locations, at the front end and the rear end, of this base 26. As shown in FIGS. 4 and 5, these roller brackets 27 are formed of a wide, rectangular horizontal plate 27a, as viewed from the top, and vertical plates 27b that run downward from the left and right ends of this horizontal plate 27a, and thus are in C shape facing downward.

Load supporting rollers 28 are attached to the outside of the two vertical plates 27b so as to be pivotable and so that the travel body 7 can travel over the conveyor surface 3. In addition, two pairs, one on the left and one on the right, of orbital rollers 29, front and rear, are attached between the two vertical plates 27b so as to be pivotable in a horizontal plane as the contact sections and the rotatable bodies according to the present invention. Typically, these orbital rollers 29 are supported so as to be pivotable within the space surrounded by the horizontal plate 27a and the two vertical plates 27b and so as to be symmetrical between the left and right sides.

Furthermore, as shown in FIG. 7, the distance between the left and right orbital rollers 29 is slightly greater than the width of the rail 22 of the conveyor surface 3 so that the orbital rollers 29 at the front and rear ends of the travel body 7 are in close proximity to the rail 22 on the left and right sides when the travel body 7 is placed on the conveyor surface 3.

As described above, the orbital rollers 29 at the front and rear ends of the travel body 7 are located on the left and right sides of the rail 22 so that the travel body 7 is regulated along the travel path over the conveyor surface 3, and in addition, the orbital rollers 29 make contact with the rail 2 in order to prevent the travel body 7 from swaying to the left and right.

As shown in FIG. 6, the roller brackets 27 are supported by axes 30, which are provided on the center line L that divides the carriage 24 into two widthwise, at the front and rear ends of the carriage 24 so as to be pivotable in a horizontal plane. That is to say, the roller bracket 27 that is supported by the axis 30 at the front end of the carriage 24 so as to be pivotable in a horizontal plane forms the leading body according to the present invention, and the roller bracket 27 that is supported by the axis 30 at the rear end of the carriage 24 so as to be pivotable in a horizontal plane forms the following body according to the present invention.

In addition, a long hole 31 is provided at approximately the center of the base 26 as viewed from the top so as to be oriented along the width and penetrate the carriage 24 in the upward/downward direction. Guide pieces 32 that are oriented along the width are provided in the front and at the rear of the long hole 31 on the upper surface of the base 26. These guide pieces 32 are arranged so as to be parallel to the long hole 31 and have approximately the same length as the long hole 31.

In addition, a sliding piece 33 that is approximately in square form as viewed from the top is placed between the front and rear guide pieces 32. The length of this sliding piece 33 between the front and rear is approximately the same as the distance between the front and rear guide pieces 32 so that the front and the rear of this sliding piece 33 are guided by the two guide pieces 32, and thus the sliding piece 33 is slidable to the left and right above the long hole 31.

A first magnetic body 18, which is a linking means according to the present invention, is attached to the lower surface of this sliding piece 33. This first magnetic body 18 can slide in the width direction as the sliding piece 33 slides above the long hole 31. Here, the range in which the first magnetic body 18 can move in the width direction is regulated by the left and right ends of the inner wall of the long hole 31 with which the first magnetic body 18 can make contact. In addition, as shown in FIG. 5, the long hole 31 and the sliding piece 33 are covered, as viewed from the top, by a support plate 35 for supporting the tray 25 from the bottom, which is attached over the front and rear guide pieces 32, so that the tray 25 can be attached to the carriage 24.

Figure 10:
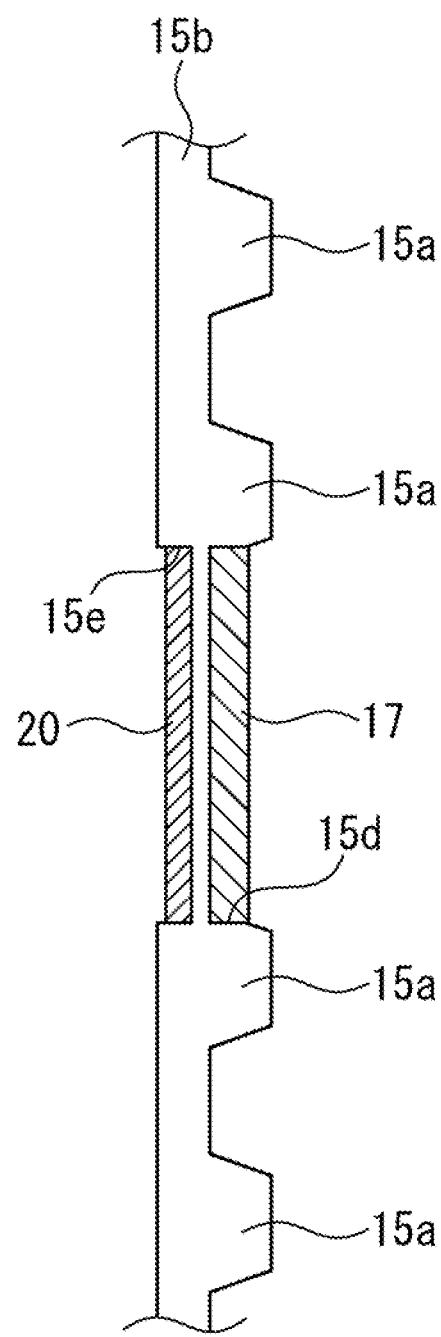
FIG. 10 is a cross-sectional diagram along C-C in FIG. 7.

As shown in FIGS. 7, 8 and 10, the below-described belt bracket 17, which is a connection portion according to the present invention, is attached to the forward-moving belt 15b as described above. Typically, the belt bracket 17 forms the connection portion according to the present invention and is in approximately L shape as viewed from the rear. In addition, an inside container recess 15d that has an opening facing inward is created in a predetermined portion on the inside (right side) of the forward-moving belt 15b, and an outside container recess 15e that has an opening facing outward is created on the outer side (left side) of the forward-moving belt 15b so as to be on the opposite side of the inside container recess 15d.

The inside container recess 15d and the outside container recess 15e penetrate in the front/rear direction, and at the same time, the lower end of the belt bracket 17 is contained in the inside container recess 15d. Meanwhile, the lower portion of a support plate 20 for attaching the belt bracket 17 to the forward-moving belt 15b is contained in the outer container recess 15e.

As shown in FIGS. 7 to 9(b), the belt bracket 17 and the support plate 20 are fastened to each other by a nut and bolt in the direction of the width above the driving belt 15 so that the lower ends of the belt bracket 17 and the support plate 20 hold the driving belt 15 from the two sides. Furthermore, the lower end of the support plate 20 is bent towards the bottom of the belt bracket 17.

As a result, the driving belt 15 is surrounded by the support plate 20 and the belt bracket 17 from the left, right and bottom, and therefore the attachment of the belt bracket 17 to the driving belt 15 can be maintained. That is to say, the belt bracket 17 forms part of the linking means together with a second magnetic body 19 in the present embodiment.

In addition, a second magnetic body 19 made of a metal having ferromagnetism or a permanent magnet, which is the linking means according to the present invention, is secured to the upper end of this belt bracket 17. Furthermore, a regulating roller 39, which rotates around the second magnetic body 19 in a horizontal plane and is the movement regulating means according to the present invention, is supported around the second magnetic body 19, and the second magnetic body 19 and the regulating roller 39, which are located at the upper end of the belt bracket 17, are placed in the above-described conveyor trench 23. Moreover, the second magnetic body 19 moves along approximately the entirety of the ordered item conveying path 1a in the conveyor trench 23 when the driving belt 15 is driven.

One of the second magnetic body 19 provided beneath the conveyor surface 3 and the first magnetic body 18 attached to the travel body 7 may be made of a ferromagnetic metal and the other may be made of a permanent magnet, or the two may be made of a permanent magnet. In the case where the two are made of a permanent magnet, the different magnet poles face each other with the conveyor surface 3 in between.

Figure 9A:
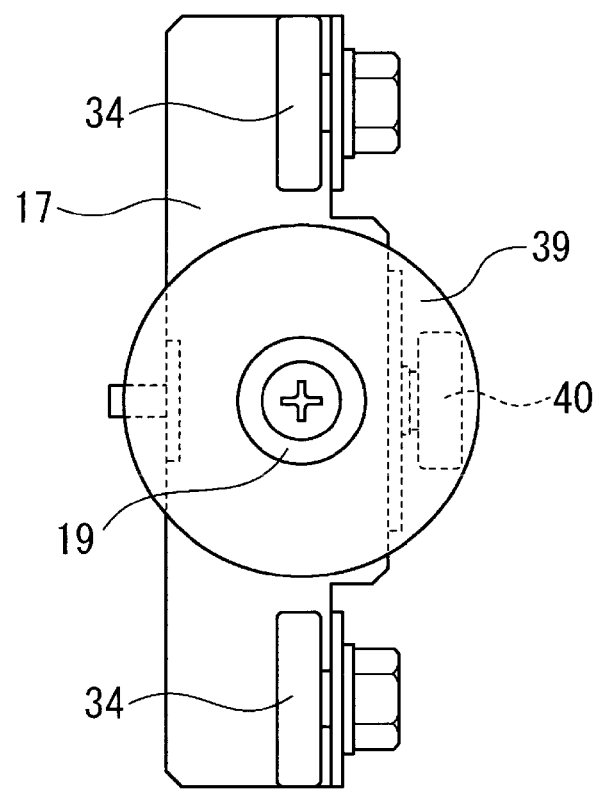
FIG. 9(a) is a plan diagram showing a belt bracket.
Figure 9B:
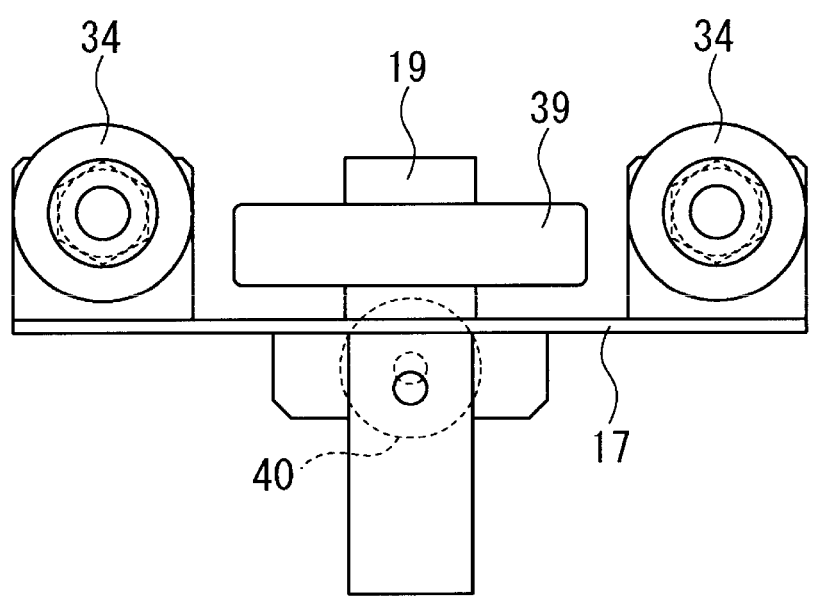
FIG. 9(b) is a side diagram showing a belt bracket.

As shown in FIGS. 8 to 9(b), a pair of guide rollers 34 that make contact with the upper surface within the conveyor trench 23 is provided to the upper end of the belt bracket 17 in such a manner that one is in front of the second magnetic body 19 and the other is to the rear of the second magnetic body 19.

Typically, these guide rollers 34 are supported by the belt bracket 17 so as to be pivotable in such a direction that the driving belt 15 can travel forwards or backwards so that the guide rollers 34 can travel together with the driving belt 15 when the driving belt 15 is driven. When the first magnetic body 18 and the second magnetic body 19, which face each other with the conveyor surface 3 in between, are attracted to each other, the second magnetic body 19 makes contact with the lower surface of the plate of which the upper surface is the conveyor surface 3 so that the driving belt 15 is prevented from being lifted upwards. That is to say, these guide rollers 34 form the lift preventing means according to the present invention.

In addition, an auxiliary roller 40 for supporting the load of the belt bracket 17 is supported by the right side portion of the belt bracket 17 so as to be pivotable in such a direction that the driving belt 15 can travel forwards or backwards. This auxiliary roller 40 makes contact on the upper surface of the guide plates 36a and 36b so that the load of the second magnetic body, the regulating roller 39 and the belt bracket 17 can be supported when they travel over the upper surface of the guide plates 36a and 36b when the driving belt 15 is driven. That is to say, the guide plates 36a, 36b and the auxiliary roller 40 form the support means according to the present invention.

The ordered item conveying path 1a and the travel body 7 are formed as described above, and thus when the driving belt 15 is driven, the travel body 7 to which the first magnetic body 18 connected to the second magnetic body 19 through a magnetic force is attached can travel over the conveyor surface 3 along the ordered item conveying path 1a.

Next, the operation of the travel body 7 that travels over the conveyor surface 3 is described. First, as shown in FIG. 6, the first magnetic body 18 faces the second magnetic body 19 that moves in the conveyor trench 23 along the straight path 12a of the ordered item conveying path 1a, and therefore the first magnetic body 18 is located at approximately the center of the long hole 31, which is along the center line L that connects the front and rear axes 30.

Figure 11:
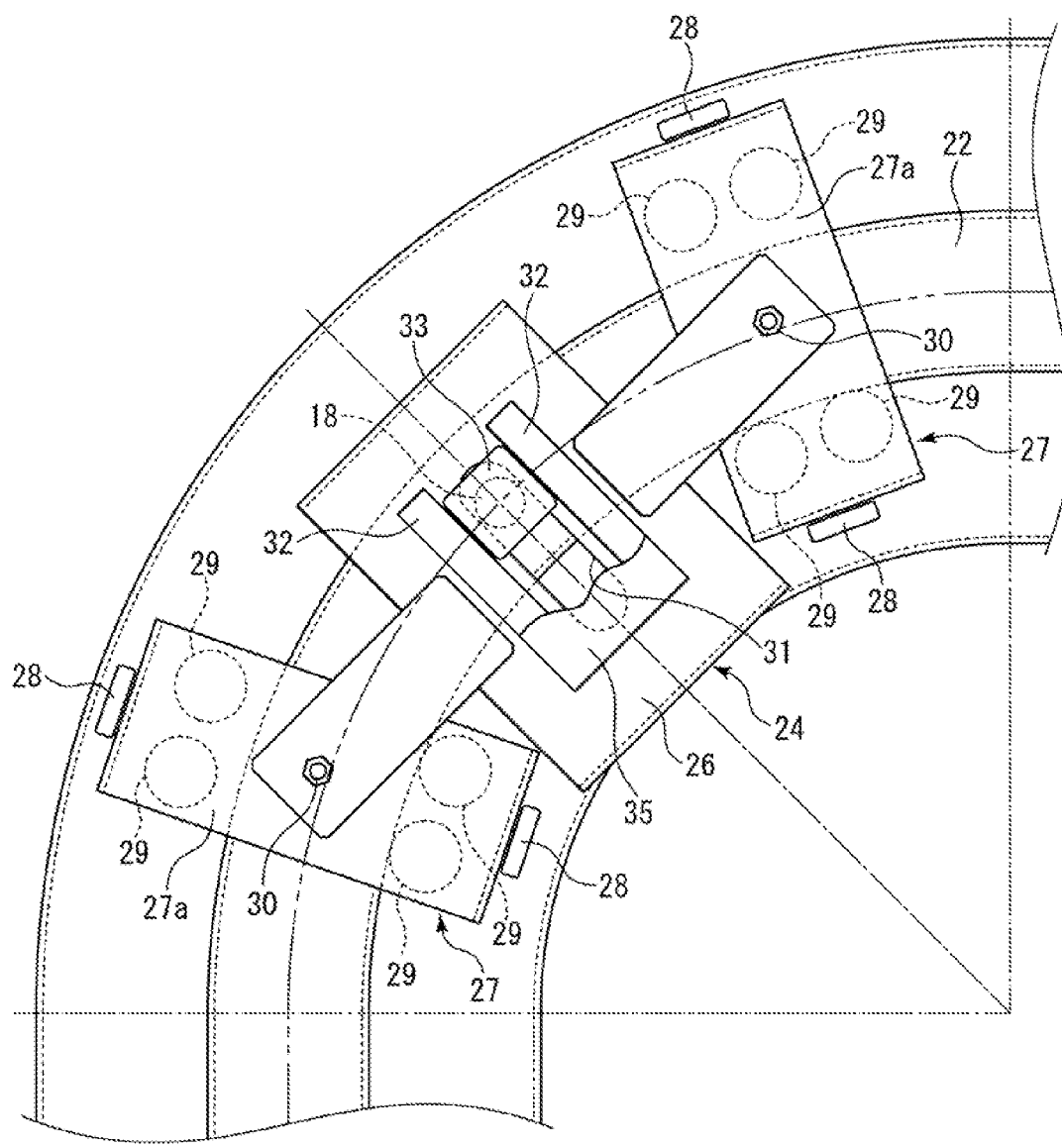
FIG. 11 is a plan diagram showing a travel body in the first corner of an ordered item conveying path.

As shown in FIG. 11, when the travel body 7 enters the first corner 10a, the two roller brackets 27 start rotating around the axes 30 so as to follow the form of the rail 22 in the first corner 10a. When the two roller brackets 27 rotate, the orbital rollers 29 on the front side of the two pairs, front and rear, of the orbital rollers 29 on the inner side of the first corner 10a start making contact with the rail 22. Furthermore, as the two roller brackets 27 rotate around the axes 30, the orbital rollers 29 on the rear side of the two pairs, front and rear, of the orbital rollers 29 in the two roller brackets 27 make contact with the rail 22, and as a result, further rotation of the two roller brackets 27 around the axes 30 is regulated when the two orbital rollers 29 in each pair at the front and rear make contact with the rail 22.

When the travel body 7 travels around the first corner 10a and there is a difference in the amount of rotation between the front roller bracket 27 and the rear roller bracket 27, there is a difference in the track between the front roller and the rear roller of the travel body 7, and therefore the center line L of the travel body 7 has a locus that is more inside the first corner 10a than the locus of the second magnetic body 19 (two-dotted chain line in FIG. 8).

At this time, the first magnetic body 18 is connected to the second magnetic body 19 through a magnetic force, and therefore the first magnetic body 18 moves towards the outer side of the first corner 10a within the long hole 31 so as to maintain the position relative to the second magnetic body 19 when the travel body 7 travels around the first corner 10a with the center line L being shifted towards the inside of the first corner 10a. That is to say, the first magnetic body 18 can move so as to follow the second magnetic body 19 when the travel body 7 travels.

At this time, the second magnetic body 19 receives force directed towards the inside of the first corner 10a, which is a direction perpendicular to the direction in which the driving belt 15 is driven, from the first magnetic body 18 when the first magnetic body 18 moves toward the outer side of the first corner 10a. However, the regulating roller 39 makes contact with the inner side of the conveyor trench 23 so that the second magnetic body 19 can be regulated from moving towards the inside of the first corner 10a. Though the regulating roller 39 is made to make contact with the inner surface of the conveyor trench 23 so that the second magnetic body 19 is regulated from moving in the present embodiment, a synthetic resin material having a small friction is attached to the inside of the conveyor trench 23 so that the second magnetic body 19 can make contact with this synthetic resin material, and thus the second magnetic body 19 can be regulated from moving towards the inside of the first corner 10.

When the travel body 7 again enters into the straight path 12a from the first corner 10a, the travel body 7 travels so that the center line L of the travel body 7 is located above the center of the rail 22, and therefore the first magnetic body 18 moves towards the center of the long hole 31 within the long hole 31.

As described above, the first magnetic body 18 attached to the travel body 7 moves so as to follow the second magnetic body 19, and therefore the state where the second magnetic body 19 and the first magnetic body 18 are connected can be maintained, and thus the travel body 7 can travel stably even when there is a difference between the orbits through which the travel body 7 and the driving belt 15 travel.

As described above, the food and drink conveying device 1 according to the present embodiment has an ordered item conveying path 1a with at least a first corner 10a and a second corner 11a, a driving belt 15 provided along the ordered item conveying path 1a, a travel body 7 that can travel along the ordered item conveying path 1a with an ordered food or drink 9 placed on top, and a first magnetic body and a second magnetic body 19 for linking the travel body 7 to the driving belt 15 so that the travel body 7 can travel along the ordered item conveying path 1a when the driving belt 15 is driven, where the travel body 7 has a base 26 that is driven to travel and a roller bracket supported by the base 26 at the front of the base 26 so as to be pivotable in a horizontal plane, and contact sections are provided on the two sides of the roller bracket 27 and aligned in the direction in which the travel body 7 travels in such a manner that the contact sections on the inner side make contact with the ordered item conveying path 1a in two places in the first corner 10a and the second corner 11a, and therefore when the travel body 7 travels around the first corner 10a or the second corner 11a, the roller bracket 27 rotates in a horizontal plane following the curvature of the first corner 10a or the second corner 11a so that the front portion of the contact section of the roller bracket 27 on the inner side of the first corner 10a or the second corner 11a makes contact with the ordered item conveying path 1a, and after that the rear portion of the contact section makes contact with the ordered item conveying path 1a, and thus the roller bracket 27 rotates following the first corner 10a or the second corner 11a so that the ordered food or drink 9 placed on top of the travel body 7 is kept horizontal while the travel body 7 travels around the first corner 10a and the second corner 11a.

In addition, the contact sections are orbital rollers 29 that are supported by the roller bracket 27 so as to be pivotable in a horizontal plane, and therefore the orbital rollers 29 rotate in a horizontal plane while making contact with the ordered item conveying path 1a so that abnormal sound can be prevented from being created through friction between the travel body 7 and the ordered item conveying path 1a.

The travel body 7 is further provided with a roller bracket 27 at the rear end of the base 26, and orbital rollers 29 are provided on the two sides of the roller bracket 27 and aligned in the direction in which the travel body 7 travels. The two orbital rollers 29 on the inner side make contact with the ordered item conveying path 1*a* when the travel body 7 travels around the first corner 10*a* or the second corner 11*a*, and therefore the travel body 7 can travel around the first corner 10*a* and the second corner 11*a* in a stable state with the two orbital rollers 29 provided to the front and rear roller brackets 27, 27 making contact with the ordered item conveying path 1*a* on the inner side of the first corner 10*a* or the second corner 11*a*.

As described above, the embodiments of the present invention are described in reference to the drawings, but the structure of the invention is not limited to these embodiments, and modifications and additions are also included in the scope of the present invention as long as the gist of the present invention is not deviated from.

For example, the above embodiments are described when the food and drink are those that can be served in a sushi restaurant, but the invention is not limited to this and can be applied to various foods and drinks.

In addition, the food and drink conveying device 1 according to the above-described embodiments is a device for conveying an ordered food or drink 9 that has been ordered by a customer, but it may be a continuously conveying device for continuously conveying food or drink that has been prepared in advance between the kitchen area C and the customer area A.

In addition, the linking means is made up of a first magnetic body 18 and a second magnetic body 19 in the above-described embodiments, but the linking means for the connection to the driving belt 15 may be a rod that can be engaged with the travel body 7 through a slit provided along the entirety of the ordered item conveying path 1*a* so that the travel body 7 can travel over the conveyor surface 3 when the driving belt 15 is driven.

Furthermore, the ordered item conveying path 1*a* and the travel body 7 in the above-described embodiments may be switched so that the travel body 7 may be suspended from the ordered item conveying path 1*a*.

EXPLANATION OF SYMBOLS

1 food and drink conveying device
1*a*, 1*b*, 2 ordered item conveying path (travel path)
7 travel body
9 ordered food or drink
10*a*, 10*b* first corner
11*a*, 11*b* second corner
12*a*, 12*b* straight path
15 driving belt (conveyor driving body)
15*a* protrusion
15*b* forward-moving belt
15*c* backward-moving belt
15*d* inside container recess
17 belt bracket (connection portion, linking means)
18 first magnetic body (linking means)
19 second magnetic body (linking means)
26 base (travel body main unit)
27 roller bracket (leading body, following body)
29 orbital roller (contact section, rotational body)
34 guide roller (lift preventing means)
36*a*, 36*b* guide plate (support means)
37*a*, 37*b* sliding roller (sliding means)
38 sub-belt
39 regulating roller (movement regulating means)
40 auxiliary roller (support means)

The invention claimed is:

1. A food and drink conveying device, comprising:
a travel path having a curved path in at least one portion, said travel path comprising a protruding rail provided at a center of the travel path, said protruding rail having a top surface interposed between two vertical side surfaces;
a conveyor driving body provided along the travel path;
a travel body on which food and drink are placed and which travels along said travel path; and
a linking means for linking said conveyor driving body to said travel body, wherein
said linking means consists of a first linking member slidably attached to said travel body and a second linking member attached to said conveyor driving body,
said travel body travels along said travel path when said conveyor driving body is driven,
said travel body comprises a travel body main unit that is driven and conveyed, and a leading body provided at a front end of the travel body main unit in the direction in which the travel body travels,
the leading body is supported by said travel body main unit so as to be pivotable around an axis in a horizontal plane so as to follow a form of the rail upon entering a curve of the rail,
the leading body is formed of a roller bracket that travels over the rail and comprises two pairs of contact sections attached to the leading body,
each of said pairs of contact sections comprises a front contact section and a rear contact section,
the first pair of said contact sections is attached to the leading body on a first side of said leading body in a widthwise direction relative to the direction in which said travel body travels,
the second pair of said contact sections is attached to the leading body on a second side of said leading body in the widthwise direction relative to the direction in which said travel body travels,
said pairs of contact sections are aligned on either side in the direction in which said travel body travels on both outer sides of the two vertical side surfaces of the protruding rail,
the pair of contact sections provided on an inner side of said curved path make contact with the vertical side surface of the protruding rail of said travel path in two locations in said curved path, such that, as the leading body enters the curve of the rail, the pair of contact sections provided on the inner side of the rail making contact in two locations regulates further rotation of the leading body around the axis such that the rotation of the leading body matches the curve of the rail,
the first linking member moves in said travel body main unit so as to follow the second linking member, as the leading body enters the curve of the rail,
said travel body further comprises a following body provided at a rear end of said travel body main unit,
the following body is supported by said travel body main unit so as to be pivotable around an axis in a horizontal plane so as to follow a form of the rail upon entering a curve of the rail,
the following body is formed of a roller bracket that travels over the rail and comprises two pairs of contact sections attached to the following body,
each of said pairs of contact sections comprises a front contact section and a rear contact section, the first pair of said contact sections is attached to the following body on a first side of said following body in a widthwise direction relative to the direction in which said travel body travels, the second pair of said contact sections is attached to the following body on a second side of said following body in the widthwise direction relative to the direction in which said travel body travels, said pairs of contact sections are aligned on either side in the direction in which said travel body travels on both outer sides of the two vertical side surfaces of the protruding rail, and the pair of contact sections of the following body provided on an inner side of said curved path make contact with the vertical side surface of the protruding rail of said travel path in two locations in said curved path, such that, as the following body enters the curve of the rail, the pair of contact sections of the following body provided on the inner side of the rail making contact in two locations regulates further rotation of the following body around the axis such that the rotation of the following body matches the curve of the rail.

2. The food and drink conveying device according to claim 1, wherein said contact sections are rotatable bodies supported by said leading body so as to be pivotable in a horizontal plane.

* * * * *